United States Patent [19]

Hiyoshi et al.

[11] Patent Number: 4,904,701
[45] Date of Patent: Feb. 27, 1990

[54] PROCESS FOR PREPARING AN ION EXCHANGE MEMBRANE

[75] Inventors: Tatsuo Hiyoshi; Makoto Miyazaki, both of Nobeoka, Japan

[73] Assignee: Asahi Kasei Kogyo Kabushiki Kaisha, Osaka, Japan

[21] Appl. No.: 206,732

[22] Filed: Jun. 15, 1988

[30] Foreign Application Priority Data

Jun. 15, 1986 [JP] Japan .................. 62-146936

[51] Int. Cl.$^4$ ............................... C08F 8/12
[52] U.S. Cl. .................................... 521/32
[58] Field of Search ................. 521/30, 27, 32; 204/252

[56] References Cited

U.S. PATENT DOCUMENTS 4,376,030 3/1983 Ezzell et al. .
4,544,458 10/1985 Grot et al. .................. 204/252
4,595,476 6/1986 Bissot .

Primary Examiner—Joseph L. Schofer
Assistant Examiner—Peter F. Kulkosky
Attorney, Agent, or Firm—Birch, Stewart, Kolasch and Birch

[57] ABSTRACT

A novel process is provided in which a membrane of a fluorinated resin having pendant ion exchange precursor groups represented by at least one formula selected from the group consisting of:

—$SO_2X$ and —CY wherein X represents a halogen atom or —OR in which R represents an alkyl group having 1 to 4 carbon atoms, and Y represents a nitrogen atom or —OX in which X is as defined above, is contacted with an aqueous solution of a basic organic compound for a period of time sufficient to perform the hydrolysis of the precursor groups. In the process of the present invention, a complicated pre-swelling step as conventionally conducted in the art is advantageously omitted. Nevertheless, an ion exchange membrane having excellent dimensional stability and performance stability can be obtained. In addition, when the obtained membrane is used in an electrolytic cell, the cell exhibits an extremely low cell voltage.

6 Claims, No Drawings

PROCESS FOR PREPARING AN ION EXCHANGE MEMBRANE

BACKGROUND OF THE INVENTION

1. Field Of The Invention

The present invention relates to a process for preparing an ion exchange membrane which can advantageously be employed to separate the anode and cathode compartments of an electrolytic cell, especially a chlor-alkali electrolytic cell.

More particularly, the present invention is concerned with a process for preparing an ion exchange membrane in which a membrane of a fluorinated resin, having pendant ion exchange precursor groups, thereon is contacted with an aqueous solution of a basic organic compound for a period of time sufficient to hydrolyze the precursor groups.

2. Discussion Of Related Art

The use of an ion exchange membrane of a fluorinated polymer, having carboxylate and/or sulfonate ion exchange groups, as a membrane for separating the anode and cathode compartments of an electrolytic cell, especially a chlor-alkali electrolytic cell, has been increasing year by year. In this field of application, it is desired that the ion exchange membrane exhibit low electrolytic cell voltage and high current efficiency, thereby enabling the electrolytic cell having the membrane incorporated therein to be stably operated with low electric power supply.

The above-mentioned ion exchange membrane of a fluorinated polymer having carboxylate and/or sulfonate ion exchange groups is conventionally manufactured by first molding into a film a fluorinated polymer, having ion exchange precursor groups and having thermoplastic properties, and then hydrolyzing the ion exchange precursor groups to thereby form carboxylate and/or sulfonate ion exchange groups. The customary method for hydrolyzing the ion exchange precursor groups comprises contacting the precursor groups with an aqueous solution of an alkali metal hydroxide or with a mixture of an aqueous solution of an alkali metal hydroxide and an organic solvent selected from an alcohol such as methanol, ethanol or propanol and a water soluble organic solvent such as dimethyl sulfoxide. The alcohol or the water soluble organic solvent is added in order to increase the hydrolysis rate of the ion exchange precursor groups.

In the art, it is well known that an ion exchange membrane is likely to swell, thereby forming wrinkles on the surface of the membrane, when it comes into contact with a cell electrolyte. This wrinkle formation is likely to be accompanied by problems, such as cell voltage increase attributed to the retention of evolved gas and/or electrolyte by the wrinkles, and such as pinhole formation and membrane tearing attributed to the rubbing of the wrinkled membrane against an electrode. To cope with these problems, proposals have been made in which an ion exchange membrane is pre-swollen prior to installation in the cell by immersing the membrane in a specific organic solvent or an aqueous solution of an organic solvent. For example, U.S. Pat. No. 4,595,476 discloses a process for preswelling an ion exchange membrane in which use is made of an aqueous solution containing an organic solvent such as diethylene glycol and triethylene glycol. Further, U.S. Pat. No. 4,376,030 discloses a process for pre-swelling an ion exchange membrane in which the membrane is pre-swollen at a temperature of from 20° to 80° C. using an aqueous solution containing an amine selected from primary, secondary and tertiary amines, most preferably triethanolamine, in an amount of from 2 to 60% by weight.

However, in any of the hitherto proposed preswelling processes, two separate steps, i.e. a hydrolysis step and a pre-swelling step, are inevitably involved. Consequently, all of the known pre-swelling processes have a drawback in that a complicated procedure is necessary.

SUMMARY OF THE INVENTION

As a result of intensive studies to obviate the drawbacks of the prior art, it has been found in accordance with the present invention that the hydrolysis of the ion exchange precursor groups of a fluorinated resin by the use of an aqueous solution of a basic organic compound eliminates the need for a complicated pre-swelling step, as has been conventionally conducted in the prior art, and that despite the omission of a pre-swelling step, unexpectedly, an ion exchange membrane having excellent dimensional stability and electrolytic performance stability can be obtained. Moreover, it has been found that when the obtained membrane is used in an electrolytic cell, the cell advantageously exhibits an extremely low cell voltage.

Accordingly, it is an object of the present invention to provide a novel process for preparing an ion exchange membrane which is useful not only for facilitating the production of an ion exchange membrane without involving an additional pre-swelling step as has been conventionally conducted in the prior art, but also for attaining improvement of membrane performance.

The foregoing and other objects, features and advantages of the present invention will be apparent from the following detailed description and appended claims.

DETAILED DESCRIPTION OF THE INVENTION

According to the present invention, there is provided a process for preparing an ion exchange membrane comprising the steps of:

(1) providing a membrane of a fluorinated resin having pendant ion exchange precursor groups represented by at least one formula selected from the group consisting of:

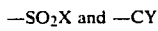

$-SO_2X$ and $-CY$ wherein X represents a halogen atom or $-OR$ in which R represents an alkyl group having 1 to 4 carbon atoms, and Y represents a nitrogen atom or $-OX$ in which X is as defined above, and (2) contacting said membrane having said precursor groups with an aqueous solution of at least one basic organic compound for a period of time sufficient to hydrolyze said precursor groups of the formula $-SO_2X$ and/or said precursor groups of the formula $-CY$ to sulfonate groups and/or carboxylate groups, respectively.

The ion exchange membrane as obtained according to the process of the present invention in which hydrolysis is conducted by the use of an aqueous solution of at least one basic organic compound, has excellent dimensional stability and also excellent performance stability during the electrolytic operation. Moreover, surprisingly, the use of the ion exchange membrane enables the cell having the membrane incorporated therein to exhibit extremely low cell voltage.

According to the process of the present invention, a membrane of a fluorinated resin having pendant ion exchange precursor groups, i.e., groups of —SO$_2$X and/or —CY, wherein X and Y are defined above, is contacted with an aqueous solution of at least one basic organic compound for a period of time sufficient to hydrolyze the precursor groups of the formula —SO$_2$X and/or the precursor groups of the formula —CY to sulfonate groups and/or carboxylate groups, respectively.

In the process of the present invention, the ratio of the amount of the aqueous solution of at least one basic organic compound to that of the membrane of a fluorinated ion exchange resin is not critical, as long as the amount of the aqueous solution is sufficient to hydrolyze the ion exchange precursor groups. Since this hydrolysis is generally conducted by immersing the membrane in the aqueous solution, however, it is generally preferred that the amount of the aqueous solution be sufficient to immerse the membrane therein. Although any excess amount of the aqueous solution may be employed without having any adverse effect, no further advantage is obtained thereby, especially from the economical point of view.

In this connection, it should be noted that the aqueous solution of at least one basic organic compound is required to contain water in an amount sufficient to perform the hydrolysis of the ion exchange precursor groups. This is because a basic organic compound is itself a Lewis base having no free hydroxyl group which is necessary for hydrolysis and, therefore, hydroxyl groups must be supplied from water molecules. The amount of water sufficient for the hydrolysis of the ion exchange precursor groups is the amount, in terms of moles, equal to or more than the total amount of the precursor groups of the formula —SO$_2$X and/or the precursor groups of the formula —CY. An appropriate water content of the aqueous solution of at least one basic organic compound is chosen taking into account the ratio of the weight of the solution to that of a membrane of a fluorinated ion exchange resin having pendant ion exchange precursor groups. However, it should be noted that when the water content of the aqueous solution is insufficient for the hydrolysis of the ion exchange precursor groups, the water deficiency can be coped with by increasing the amount of the aqueous solution.

For the above reason, it is not quite proper to define the amount of water to be present in an aqueous solution of at least one basic organic compound in terms of the water content of the aqueous solution. However, in general, the water content of the aqueous solution is at least about 0.01% by volume, based on the volume of the aqueous solution. When the water content of the aqueous solution is less than this value, it would be difficult to hydrolyze the precursor groups. The water content of the aqueous solution is preferably in the range of from 0.1 to 40% by volume, based on the volume of the solution. When the water content is in this range, the rate of hydrolysis is sufficiently high and the membrane obtained by the process of the present invention has an effect of exhibiting sufficiently reduced cell voltage. It is especially preferred that the water content of the aqueous solution be in the range of 0.1 to 30% by volume, based on the volume of the solution. When the water content is in this range, the effect of reducing the cell voltage exhibited by the membrane obtained by the process of the present invention is particularly remarkable.

To the aqueous solution of at least one basic organic compound, there may be added an alkali metal hydroxide such as lithium hydroxide, sodium hydroxide and potassium hydroxide, and an alkali metal salt such as sodium chloride, potassium chloride, sodium bromide, potassium bromide and lithium chloride, alone or in combination, in an amount of less than 15% by weight, based on the total weight of the aqueous solution. The type and concentration of the alkali metal hydroxide and alkali metal salt added affect the type and proportion of the counter ions for the ion exchange groups formed after hydrolysis. Further, the type and proportion of the counter ions, in turn, affect the properties of the ion exchange membrane Therefore, by controlling the type and concentration of the alkali metal hydroxide and alkali metal salt to be added, the properties of the membrane can advantageously be controlled so that the effects of the present invention are fully exhibited.

The addition of an alkali metal hydroxide is especially preferable because it increases the rate of hydrolysis.

As the basic organic compound, there may be employed a basic nitrogen compound such as an amine or an imine. Examples of such compounds include triethanolamine, diethanolamine, triethylamine, diethylamine, morpholine, isopropylmethylamine, ethylmethyl-n-propylamine, ethyleneimine, dimethylaminoethanol, n-octylamine, benzylmethylamine, N,N'-dimethylbenzylamine, dodecylamine, tertiary octylamine, tri-n-octylamine, diethylenetriamine, isopropanolamine, diisopropanolamine, triisopropanolamine, pyrrolidine, piperidine and piperazine. Of these, triethanolamine, diethanolamine, isopropanolamine, diisopropanolamine, triisopropanolamine, dimethylaminoethanol and diethylaminoethanol are preferred. Triethanolamine and diethanolamine are especially preferred.

In the process of the present invention, the hydrolysis of ion exchange precursor groups is generally carried out at a temperature of 30° to 150° C., preferably 70° to 130° C. When the hydrolysis is conducted at a temperature of lower than 30° C., not only is a prolonged period of time needed to complete the hydrolysis, but also the ultimate ion exchange membrane obtained does not exhibit a desirable effect of reducing the cell voltage. On the other hand, when the hydrolysis is conducted at a temperature of higher than 150° C., an ion exchange membrane having a decreased mechanical strength and a considerably lowered selective permeability for cations is produced, thereby causing the purity of the alkali produced and the current efficiency to be decreased. When the hydrolysis is carried out at a temperature of from 70° to 130° C., the ion exchange membrane obtained has the advantageous effect of enabling electrolysis to be conducted at an extremely low cell voltage.

The period of time for which the hydrolysis of ion exchange precursor groups is to be effected varies depending on the type of the basic organic compound, the composition of the aqueous solution and the temperature at which the hydrolysis is effected However, it is generally in the range of from 0.5 to 100 hours.

The fluorinated resin to be treated in the present invention may be at least one copolymer as obtained by reacting at least one fluorovinyl compound represented by the formula:

  (1)

wherein L represents a fluorine atom or a perfluoro alkyl group having 1 to 3 carbon atoms; m is an integer of 0 to 3; n is an integer of 1 to 3; and W represents a functional group which can be converted by hydrolysis to a group represented by the formula —$CO_2M$ or —$SO_3M$ in which M represents a hydrogen atom, an alkali metal atom or a quaternary ammonium group, with at least one fluorinated olefin represented by the formula:

$$CF_2=CFZ \qquad (2)$$

wherein Z represents a hydrogen atom, a chlorine atom, a fluorine atom or a perfluoro alkyl group having 1 to 3 carbon atoms.

The above-mentioned functional group W which can be converted to a group represented by the formula —$CO_2M$ or —$SO_3M$ by hydrolysis is a group represented by the formula —$SO_2X$ or —CY wherein X represents a halogen atom or —OR in which R represents an alkyl group having 1 to 4 carbon atoms, and Y represents a nitrogen atom or —OX in which X is as defined above. Examples of functional groups include —$SO_2F$, —$SO_2Cl$, —$SO_2Br$, —COF, —COCl, —COBr, —$CO_2CH_3$ and —$CO_2C_2H_5$. Further, such a functional group may be a group obtained by subjecting a carboxylic acid group to esterification or an acid halide forming reaction in accordance with the method for chemical modification described, for example, in U.S. Pat. No. 4,151,053.

The above-mentioned copolymer from monomers of formula (1) and formula (2) may further comprise third monomer units. Examples of third monomer units include those from a vinyl ether having no functional group, such as perfluorovinyl perfluoromethyl ether represented by the formula $CF_2=CFOCF_3$.

The membrane of a fluorinated resin to be treated in the present invention does not necessarily have a single layer structure composed of a single type of copolymer, but may have a multi-layer structure composed of a plurality of layers of different copolymers. Such a multi-layer structure may, for example, be composed of two layers of different copolymers having different functional groups. Alternatively, the multi-layer structure may be composed of two layers of copolymers having different equivalent weights, or may be composed of two layers of copolymers each having at least two types of functional groups whose types and proportions are varied at every layer.

The equivalent weight of the fluorinated resin membrane to be used in the present invention is appropriately selected according to the type and structure of the fluorovinyl compound employed. For example, when a fluorovinyl compound of the formula (I) wherein m is 1, n is 2 or 3 and L is —$CF_3$, is used, the equivalent weight of the fluorovinyl compound is selected to be within the range of from 600 to 1500. When the equivalent weight is less than 600, the resultant membrane swells extremely in an electrolyte so that the mechanical properties and electrochemical properties of the membrane become poor. On the other hand, when the equivalent weight is more than 1500, the electrical resistance of the resultant membrane is undesirably high.

A copolymer from a compound of the formula (I) and a compound of the formula (II) may be molded into a membrane using a press, rolls, an extruder or other conventional machines. The resultant membrane may be reinforced by a reinforcing material. The reinforcement of the membrane may be attained for example, by encapsulating a reinforcing material in the membrane. The reinforcing material is preferably composed of a chemically inert perhalocarbon polymer such as a tetrafluoroethylene homopolymer and a copolymer of tetrafluoroethylene and hexafluoropropylene and/or perfluorovinyl ether. The reinforcing material may take various forms. Generally, however, it is preferred that the reinforcing material be in the form of a woven fabric, e.g., a cloth or a net, a non-woven fabric or a porous article. Further, a stretched microporous polytetrafluoroethylene sheet as employed in U.K. Patent No. 2,091166 is also useful as a reinforcing material.

Chlor-alkali electrolysis for the production of an alkali metal hydroxide using the cation exchange membrane prepared by the present process can be conducted in a divided cell as is conventionally employed When such electrolysis is conducted at a current density of from 5 to 50 A/$dm^2$ and at a temperature of from 50° to 110° C., an alkali metal hydroxide can stably be produced in a concentration of from 10 to 45% by weight, at a current efficiency as high as 90% or more, at a low cell voltage for a prolonged period of time, as shown in Table 1 below.

The reason why the ion exchange membrane prepared by the present process advantageously exhibits low cell voltage and stable electrolytic performance in the cell is believed to be as follows.

When the ion exchange membrane prepared by the present process is contacted with the electrolyte in a cell, the membrane is tensed to an appropriate extent. As a result, no wrinkles are formed. This is considered to be a major reason for the low cell voltage and for the substantial absence of the formation of pinholes. Moreover, with respect to the ion exchange membrane prepared by the present process, the cell voltage-lowering effect is not only unexpectedly excellent but also lasts for a prolonged period of time. The reason for this has not yet been elucidated, but is presumed to reside in the fact that, different from the ion exchange membrane prepared by the conventional method comprising a hydrolysis step and a pre-swelling step, an irreversible structural change of the ion exchange membrane occurs by the action of the basic organic compound in the course of the formation of a cluster structure of ion exchange groups in the fluorinated ion exchange resin, thereby bringing about the above-mentioned surprising effects of the present invention The process of the present invention is very simple as compared to the conventional processes. In addition, the ion exchange membrane prepared by the process of the present invention has good dimensional stability and stable electrolytic performance, and advantageously exhibits low cell voltage.

DETAILED DESCRIPTION OF PREFERRED EMBODIMENTS

The present invention will now be described in more detail with reference to the following Examples and Comparative Examples, which should not be construed as limiting the scope of the present invention

EXAMPLE 1

Film B of 1090 in equivalent weight and 102 μm in thickness comprising a copolymer of tetrafluoroethylene and methyl perfluoro(4,7-dioxa-5-methyl-8-nonanesulfonyl fluoride) is laminated onto film A of 1150 in equivalent weight and 25 μm in thickness comprising a copolymer of tetrafluoroethylene and perfluoro(4,7-dioxa-5-methyl-8-nonenoate) by the application of heat to the films, thereby obtaining a two-layer laminated sheet. A plain woven fabric of polytetrafluoroethylene fibers of 100 denier is encapsulated in the layer of film B of the laminated sheet, thereby obtaining a reinforced membrane having pendant ion exchange precursor groups.

15 ml of a 15% by weight aqueous sodium hydroxide solution is added to 485 ml of triethanolamine, and sufficiently stirred, thereby preparing an aqueous solution for hydrolysis containing 3% by volume of water. In this solution, the above obtained membrane is immersed at 110° C. for 20 hours to thereby effect the hydrolysis reaction of the ion exchange precursor groups. After completion of this hydrolysis treatment, the resultant ion exchange membrane is taken out from the solution, and washed with water. A thin slice sample is cut off from the ion exchange membrane using a microtome, along the transverse cross section of the membrane. The sample is stained with an acidic aqueous solution of malachite green exhibiting a pH value of 2. The stained sample is observed through a microscope. As a result, it is found that the layer of film A and the layer of film B are stained in blue and yellow, respectively, thereby confirming that all the pendant ion exchange precursor groups are hydrolyzed.

Then, the electrolytic performance of the ion exchange membrane is examined by the use of a compact brine electrolytic cell having a current passage area of 10 cm × 10 cm, as follows. The cathode incorporated in the cell comprises a titanium substrate with ruthenium coated thereon. The anode incorporated in the cell comprises a nickel substrate a nickel oxide coated thereon by the common plasma spray technique. The hydrolyzed ion exchange membrane is placed in the cell in a manner such that the layer of film A of the ion exchange membrane faces the cathode. The concentration of the aqueous sodium chloride solution in the anode compartment is maintained at 3.5N, and the sodium hydroxide concentration of the solution in the cathode compartment is maintained at 30% by weight by feeding water thereto. Electrolysis is conducted at 90° C. at 40 A/dm² for 4 weeks. The results are shown in Table 1. After completion of the electrolysis, the ion exchange membrane is examined. No wrinkles ascribed to the electrolysis are observed.

EXAMPLE 2

Substantially the same procedure as described in Example 1 is repeated except that the hydrolysis is conducted at 50° C. for 60 hours. The results of the measurement with respect to the electrolytic performance of the ion exchange membrane are shown in Table 1. After completion of the electrolysis, the ion exchange membrane is examined. No wrinkles ascribed to the electrolysis are observed.

EXAMPLE 3

The same reinforced ion exchange membrane having pendant ion exchange precursor groups as prepared in Example 1 is subjected to hydrolysis treatment at 90° C. for 30 hours using an aqueous solution consisting of 350 ml of triethanolamine and 150 ml of water. Water is contained in the solution in an amount of 30% by volume. The ion exchange membrane is taken out from the solution, then a thin slice sample is cut off from the ion exchange membrane, stained and observed through a microscope, in substantially the same manner as in Example 1. As a result, it is confirmed that all the pendant ion exchange precursor groups are hydrolyzed. The electrolytic performance of the hydrolyzed ion exchange membrane is measured in substantially the same manner as in Example 1. The results are shown in Table 1.

EXAMPLE 4

Hydrolysis treatment is conducted in substantially the same manner as in Example 3, except that an aqueous solution consisting of 350 ml of triethanolamine, 150 ml of water and 55 g of sodium hydroxide is employed in place of the solution consisting of 350 ml of triethanolamine and 150 ml of water, and that the reaction time is changed to 15 hours. The resultant membrane is subjected to a staining test in substantially the same manner as in Example 1, thereby confirming the completion of the hydrolysis reaction. With respect to the membrane, the electrolysis performance is examined in substantially the same manner as in Example 1. The results are shown in Table 1.

EXAMPLE 5

The same membrane having pendant ion exchange precursor groups as obtained in Example 1 is immersed in triethanolamine at 110° C. for 20 hours to effect hydrolysis. Subsequently, the membrane is taken out, and washed with water. From the washed membrane, a thin slice is cut off along the transverse cross-section of the membrane, and the slice is subjected to a staining test, in substantially the same manner as in Example 1. When the stained slice is observed through a microscope, it is found that the layer A and the layer B are stained in blue and yellow, respectively, thereby confirming the completion of the hydrolysis reaction. When the water content of the triethanolamine employed is measured by the Karl Fischer method according to Japanese Industrial Standard (JIS) K-0068, item 2.1, it is determined to be 0.3% by volume. The thus obtained membrane is examined with respect to the electrolysis performance in substantially the same manner as in Example 1. The results are shown in Table 1. When the membrane is examined after the electrolysis, the formation of wrinkles is not observed at all.

EXAMPLE 6

Using the same membrane as in Example 5, hydrolysis treatment is conducted in substantially the same manner as in Example 5, except that diethanolamine is employed in place of triethanolamine. When the water content of the diethanolamine employed is measured, it is found to be 0.1% by volume. With respect to the resultant membrane, the electrolysis performance is examined. The results are shown in Table 1.

COMPARATIVE EXAMPLE 1

The same membrane having pendant ion exchange precursor groups as obtained in Example 1 is subjected to hydrolysis at 90° C. for 8 hours in an aqueous solution containing 30% by weight of dimethyl sulfoxide and 11% by weight of potassium hydroxide, followed by confirmation of the completion of the hydrolysis in substantially the same manner as in Example 1. With respect to the resultant membrane, the electrolysis performance is examined, and the results are shown in Table 1. When the membrane is examined after electrolysis, linear wrinkles are observed starting at the center of the membrane and running toward the four corners of the membrane.

EXAMPLE 7

Substantially the same procedure as in Example 1 is repeated, except that the hydrolysis treatment temperature is changed to 25° C. and the hydrolysis treatment time is changed to 200 hours. The electrolysis performance of the resultant membrane is shown in Table 1. When the membrane is examined after electrolysis, wrinkles are observed.

EXAMPLE 8

Substantially the same procedure as in Example 1 is repeated, except that a homogeneous aqueous solution prepared from 200 ml of triethanolamine, 250 ml of water (55.6% by volume based on the total volume of the solution) and 3 g of sodium hydroxide is employed in the hydrolysis treatment. Then, the completion of the hydrolysis is confirmed in substantially the same manner as in Example 1. With respect to the resultant membrane, the electrolysis performance is examined in substantially the same manner as in Example 1, except that the electrolysis time is changed to 14 days. The results are shown in Table 1.

EXAMPLE 9

Substantially the same procedure as in Example 1 is repeated, except that a stainless steel pressure vessel having a capacity of 800 ml is employed, and that the hydrolysis temperature is changed to 160° C. With respect to the resultant membrane, the electrolysis performance is examined. The results are shown in Table 1.

Comparative Example 1. The resultant membrane is immersed in 30% aqueous triethanolamine at 80° C. for 30 min, thereby pre-swelling the membrane. With respect to the membrane, the electrolysis performance is examined in substantially the same manner as in Example 1. As a result, it is found that the current efficiency is 96%, that the cell voltage is 3.44 V, and that the NaCl concentration of the catholyte is 18 ppm.

EXAMPLE 10

Film B of 1090 in equivalent weight and 100 μm in thickness comprising a copolymer of tetrafluoroethylene and methyl perfluoro(4,7-dioxa-5-methyl-8nonanesulfonyl fluoride) is laminated onto film A of 1150 in equivalent weight and 25 μm in thickness comprising a copolymer of tetrafluoroethylene and methyl perfluoro(4,7-dioxa-5-methyl-8-nonenoate), by the application of heat to the films. Then, a plain woven fabric comprising polytetrafluoroethylene fibers of 100 denier is encapsulated into the film B side of the above-obtained laminate membrane, thereby obtaining a reinforced membrane. The reinforced membrane is immersed in a homogeneous aqueous solution consisting of 440 ml of diethanolamine and 54 ml of 4.8% by weight aqueous KOH at 120° C. for 2 hours, thereby effecting hydrolysis. The resultant membrane is subjected to a staining test in substantially the same manner as in Example 1, thereby confirming the completion of hydrolysis. Then, the membrane is examined with respect to the electrolysis performance. As a result, it is found that the current efficiency is 97%, that the cell voltage is 3.30 V, and that the NaCl concentration of the catholyte is 15 ppm. When the membrane is examined after the electrolysis, the formation of wrinkles is not observed.

TABLE 1

| | | | | | Electrolysis performance | | |
| --- | --- | --- | --- | --- | --- | --- | --- |
| | Solvent | Additive | Temperature (C.°) | Time (hr) | Current efficiency (%) | Cell voltage (V) | Nacl conc. of catholyte (ppm) |
| Example 1 | 485 ml of triethanolamine | 15 ml of 15 wt % aq. NaOH | 110 | 20 | 96 | 3.23 | 13 |
| Example 2 | 485 ml of triethanolamine | 15 ml of 15 wt % aq. NaOH | 50 | 60 | 97 | 3.28 | 13 |
| Example 3 | 350 ml of triethanolamine | 150 ml of water | 90 | 30 | 96 | 3.28 | 13 |
| Example 4 | 350 ml of triethanolamine | 150 ml of water and 55 g of NaOH | 90 | 15 | 97 | 3.28 | 12 |
| Example 5 | 500 ml of triethanolamine | — | 110 | 20 | 95 | 3.25 | 18 |
| Example 6 | 500 ml of diethanolamine | — | 110 | 20 | 96 | 3.26 | 16 |
| Comparative Example 1 | 150 g of dimethyl sulfoxide | 295 g of water and 55 g of KOH | 90 | 8 | 96 | 3.45 | 15 |
| Example 7 | 485 ml of triethanolamine | 15 ml of 15 wt % aq. NaOH | 25 | 200 | 97 | 3.40 | 13 |
| Example 8 | 200 ml of triethanolamine | 250 ml of water and 3 g of NaOH | 110 | 20 | 96 | 3.38 | 17 |
| Example 9 | 485 ml of triethanolamine | 15 ml of 15 wt % aq. NaOH | 160 | 20 | 93 | 3.20 | 40 |

COMPARATIVE EXAMPLE 2

The same membrane having pendant ion exchange precursor groups as obtained in Example 1 is subjected to substantially the same hydrolysis treatment as in

What is claimed is:
1. A process for preparing an ion exchange membrane comprising the steps of:

(1) providing a membrane of at least one fluorinated resin having pendant ion exchange precursor groups, said fluorinated resin being at least one copolymer obtained by reacting at least one fluorovinyl compound represented by the formula:

$$CF_2=CF-O-(CF_2CFL)_m-O-(CF_2)_n-W$$

wherein L represents a fluorine atom or a perfluoroalkyl group having 1 to 3 carbon atoms, m is an integer of 0 to 3, n is an integer of 1 to 3, and W represents a functional group selected from the group consisting of:

$$-SO_2X \text{ and } -CY$$

wherein X represents a halogen atom or —OR in which R represents an alkyl group having 1 to 4 carbon atoms, and Y represents a nitrogen atom or —OX in which X is as defined above, with at least one fluorinated olefin represented by the formula:

$$CF_2=CFZ$$

wherein Z represents a hydrogen atom, a chlorine atom, a fluorine atom or a perfluoroalkyl group having 1 to 3 carbon atoms, said w forming said pendant ion exchange precursor groups, and (2) contacting without preswelling said membrane with an aqueous solution consisting essentially of at least one basic organic compound for a period of from about 0.5 to about 100 hours to hydrolyze said precursor groups of the formula —SO$_2$X and/or said precursor groups of the formula —CY to sulfonate groups and/or carboxylate groups, respectively, said basic organic compound being at least one basic nitrogen compound selected from the group consisting of triethanolamine, diethanolamine, triethylamine, diethylamine, morpholine, isopropylmethylamine, ethylmethyl-n-propylamine, ethyleneimine, dimethy,laminoethanol, n-octylamine, benzylmethylamine, N,N'-dimethylbenzylamine, dodecylamine, tertiary octylamine, tri-n-octylamin diethylenetriamine, isopropanolamine, diisopropanolamine, triisopropanolamine, pyrrolidine, piperidine and piperazine.

2. The process according to claim 1, wherein said membrane is contacted with the aqueous solution at a temperature of from about 30° to about 150° C.

3. The process according to claim 2, wherein said membrane is contacted with the aqueous solution at a temperature of from about 70° to about 130° C.

4. The process according to claim 1, wherein said aqueous solution has a water content of at least about 0.01% by volume, based on the volume of the solution.

5. The process according to claim 4, wherein said aqueous solution has a water content of from about 0.1 to about 40% by volume, based on the volume of the solution.

6. The process according to claim 4, wherein said basic organic compound is selected from the group consisting of triethanolamine, diethanolamine, isopropanolamine, diisopropanolamine, triisopanolamine, dimethylaminoethanol and diethylaminoethanol.

* * * * *